US011292293B2

(12) United States Patent
James

(10) Patent No.: US 11,292,293 B2
(45) Date of Patent: Apr. 5, 2022

(54) RACK AND APPARATUS FOR SUPPORTING WHEELS

(71) Applicant: Workplace Maintenance Solutions Pty Ltd, Riddells Creek (AU)

(72) Inventor: Allan Martin James, Riddells Creek (AU)

(73) Assignee: Workplace Maintenance Solutions Pty Ltd (ACN 626 363 095), Riddells Creek (AU)

( * ) Notice: Subject to any disclaimer, the term of this patent is extended or adjusted under 35 U.S.C. 154(b) by 0 days.

(21) Appl. No.: 16/753,473

(22) PCT Filed: Oct. 3, 2018

(86) PCT No.: PCT/AU2018/051073
§ 371 (c)(1),
(2) Date: Apr. 3, 2020

(87) PCT Pub. No.: WO2019/068143
PCT Pub. Date: Apr. 11, 2019

(65) Prior Publication Data
US 2020/0290399 A1 Sep. 17, 2020

(30) Foreign Application Priority Data
Oct. 4, 2017 (AU) ................................ 2017904000

(51) Int. Cl.
B65D 85/06 (2006.01)
B60B 29/00 (2006.01)
(Continued)

(52) U.S. Cl.
CPC .............. B60B 29/001 (2013.01); A47F 7/04 (2013.01); B60B 29/002 (2013.01); B60B 30/02 (2013.01);
(Continued)

(58) Field of Classification Search
CPC ...... B60B 29/001; B60B 29/002; B60B 30/10; B60B 30/02; A47F 7/04; B65D 85/06
See application file for complete search history.

(56) References Cited

U.S. PATENT DOCUMENTS 2,380,415 A * 7/1945 Carruthers ............ B60B 29/002
414/429
2,956,763 A * 10/1960 D Arca .................. B65D 19/12
108/53.1
(Continued)

FOREIGN PATENT DOCUMENTS

DE 3440042 A1 5/1986
EP 2338696 B1 4/2015
(Continued)

OTHER PUBLICATIONS

International Application Serial No. PCT/AU2018/051073, Search Report and Written Opinion dated Nov. 13, 2018, 11 pgs.
(Continued)

*Primary Examiner* — Mark C Hageman
(74) *Attorney, Agent, or Firm* — Kwan & Olynick LLP

(57) ABSTRACT

In the context of service and maintenance of heavy road vehicles, apparatus is provided that is configured to engage and support a rack and manoeuvre it into position relative to the vehicle to facilitate removal and installation of the wheels. The rack has a frame with a base and a pair of arms, each arm being pivotally attached to opposite sides of the base to pivot between an open configuration and a folded configuration. The apparatus may be expanded and contracted between an expanded configuration, where the rack engagement assembly is configured to engage the rack in the open configuration, and a contracted configuration where the rack engagement assembly is configured to engage the rack in the folded configuration.

6 Claims, 6 Drawing Sheets

(51) Int. Cl.
  *B60B 30/02* (2006.01)
  *B60B 30/10* (2006.01)
  *B66F 7/06* (2006.01)
  *B66F 7/08* (2006.01)
  *A47F 7/04* (2006.01)

(52) U.S. Cl.
  CPC .............. *B60B 30/10* (2013.01); *B65D 85/06* (2013.01); *B66F 7/0625* (2013.01); *B66F 7/08* (2013.01)

(56) References Cited

U.S. PATENT DOCUMENTS

| | | | | |
|---|---|---|---|---|
| 3,812,974 | A * | 5/1974 | Sylvester | B29D 30/0016 211/23 |
| 3,850,295 | A * | 11/1974 | Black | B65D 85/06 206/304 |
| 4,042,139 | A | 8/1977 | Pernsteiner et al. | |
| 4,350,470 | A * | 9/1982 | Murillo | B60B 29/002 280/79.11 |
| 6,581,785 | B1 * | 6/2003 | Falkenstein | A47F 7/04 211/24 |
| 7,044,065 | B2 * | 5/2006 | Arai | B65D 19/12 108/53.1 |
| 7,097,406 | B1 * | 8/2006 | Gang | B60B 29/002 254/105 |
| 8,955,700 | B2 * | 2/2015 | Barber | A47F 7/04 211/195 |
| 9,580,236 | B1 * | 2/2017 | Skeid | B65D 90/54 |
| 2007/0290179 | A1 | 12/2007 | Hedley et al. | |
| 2015/0290972 | A1 * | 10/2015 | Minor | B60B 29/002 254/4 B |

FOREIGN PATENT DOCUMENTS

| | | |
|---|---|---|
| WO | 2010000018 A1 | 1/2010 |
| WO | 2015042658 A1 | 4/2015 |

OTHER PUBLICATIONS

European Supplemental Search Report, Application No. 18863909.0, PCT/AU2018051073, dated Aug. 19, 2021, 9 pages.

* cited by examiner

RACK AND APPARATUS FOR SUPPORTING WHEELS

CROSS-REFERENCE TO RELATED APPLICATIONS

This application is the U.S. national phase of PCT Application No. PCT/AU2018/051073 filed on 3 Oct. 2018, which claims a priority to the Australian Provisional Patent Application No. 2017904000 filed on 4 Oct. 2017, both of which are incorporated herein by reference in their entirety and for all purposes.

TECHNICAL FIELD

The present disclosure invention relates a rack and apparatus for supporting wheels.

BACKGROUND

A brake re-line for a heavy vehicle involves servicing and removal of all heavy brakes assemblies by first removing all the wheels. For example if the brakes on a B Double trailer are to be serviced, then the 24 wheels (12 dual sets) must be first removed one by one so that the brake assemblies are inspected to assess wear and the level of service required. This wheel removal process is time consuming, inconvenient and costly and as each wheel with tyre weighs about 65 kg and is over a metre in diameter, removal and re-installation of the wheels is not only generally awkward but involves significant health and safety concerns. Furthermore the wheels when removed from the vehicle take up significant storage space and present rolling and trip hazards.

Existing prior art devices for removing and installing tyres on heavy vehicles are poorly designed thereby being generally awkward and inconvenient to use.

According to a first aspect, there is provided a rack for holding a wheel in an upright position, wherein the rack has a frame having a base and a pair of arms, each arm being pivotally attached to opposite sides of the base to pivot between an open configuration wherein the arms are arranged to extend generally upwardly so as to receive an upright wheel therebetween and a folded configuration wherein the arms are foldable inwardly onto the base.

According to an embodiment, each arm has a lower portion arranged to as to support a lower rim portion of a tyre of the wheel above the base, such that, when the wheel is so supported in the upright position, the arms rotate inwardly to clamp upper portions thereof about the opposing sides of the rim of the tyre.

According to an embodiment, the rack has a pair of support portions on opposing sides of each arm, wherein the support portions are arranged to receive opposing side edges of the tyre rim.

According to an embodiment, the arms are one of two pairs of arms, such that the rack is configured to receive a pair of upright wheels in parallel spaced-apart configuration, each wheel being receivable in one of each pair of associated arms.

According to an embodiment, the arms on each side of the base are coupled together so as to be rotatable in tandem.

According to an embodiment, when in the folded configuration, the rack is stackable onto another such folded rack so as form a vertical stack.

According to a second aspect, there is provided an apparatus for supporting a wheel received on a rack as described above, the apparatus configured to engage the rack to facilitate removal and installation of the wheel on a heavy vehicle, the apparatus comprising: a rack engagement assembly configured to engage accessible portions of the rack and to support the rack when so engaged; a lifting assembly for raising and lowering the rack engagement assembly and the rack, when so engaged by the rack engagement assembly, wherein the apparatus is configured to be positionable relative to the heavy vehicle and movable away from the vehicle to facilitate removal and installation of the wheels; and wherein the apparatus is expandable and contractible between an expanded configuration where the rack engagement assembly is configured to engage the rack in the open configuration, and a contracted configuration where the rack engagement assembly is configured to engage the rack in the folded configuration.

According to an embodiment, the lifting assembly has a pair of lifting devices, each lifting device comprising at least one linked foldable support member configured to be driven for movement in the vertical plane, an upper portion of the support member(s) associated with the rack engagement assembly and a lower portion of the support member(s) associated with the apparatus and wherein the foldable support member(s) is extendable and retractable to raise and lower the rack engagement assembly.

According to an embodiment, the apparatus has a frame with spaced-apart feet, the rack being receivable in the space defined by the feet.

According to an embodiment, the apparatus has a hydraulically powered system including a pair of hydraulic cylinders, each cylinder for driving support member(s) associated with a respective foot.

According to an embodiment, the hydraulically-powered system has a main hydraulic cylinder for driving the aforementioned pair of hydraulic cylinders.

According to an embodiment, when the apparatus is in the contracted configuration, the rack engagement assembly is configured to engage the lower-most rack in a vertical stack of racks, each rack in the folded configuration.

According to an embodiment, the apparatus has a generally horizontal handle supported above the frame by an upright member, the handle being rotatable about the upright member between adjacent sides of the frame to assist a user in moving the apparatus from that frame side.

According to a third aspect, there is provided a system for removing and installing tyres on a heavy vehicle, having an apparatus as described above, the apparatus being engageable with a rack as described above, and wherein, when the rack is so engaged, the apparatus is positionable relative to the heavy vehicle and movable away from the vehicle for facilitating removal and installation of the wheels.

According to an embodiment there is provided a system where the apparatus, when in the expanded configuration, is engageable with a rack as described above in the open configuration, and wherein, when the rack carrying at least one wheel is so engaged, the apparatus is positionable relative to the heavy vehicle and movable away from the vehicle to facilitate removal and installation of the wheel(s).

According to an embodiment there is provided a system where the apparatus, when in the contracted configuration, is engageable with a rack or lower-most rack of a vertical stack of racks in the folded configuration, and the apparatus is positionable to facilitate removal and storage of the engaged rack and any folded racks when supported thereon.

According to a fourth aspect, there is provided a method of removing and installing wheels on a vehicle using the system as described, comprising the steps of: lifting an axle of the vehicle so that the wheel is suspended from the axle;

positioning a rack in an open configuration under the wheel; engaging a rack in the open configuration with the rack engagement assembly of the apparatus; lifting the apparatus to engage with the rack and the wheel received in the rack; and removing the engaged rack from the vehicle.

According to an embodiment, the vehicle is a heavy vehicle and the wheel is one of a pair of wheels carried on an axle of the heavy vehicle, the wheels being receivable in the rack in a spaced-apart configuration.

In order that the various aspects, features, operations and advantages of the disclosure may be better understood, the following detailed description of several embodiments is provided, presented by way of non-limiting example only, and with reference to the accompanying drawings in which:

BRIEF DESCRIPTION

DETAILED DESCRIPTION

Figure 1:
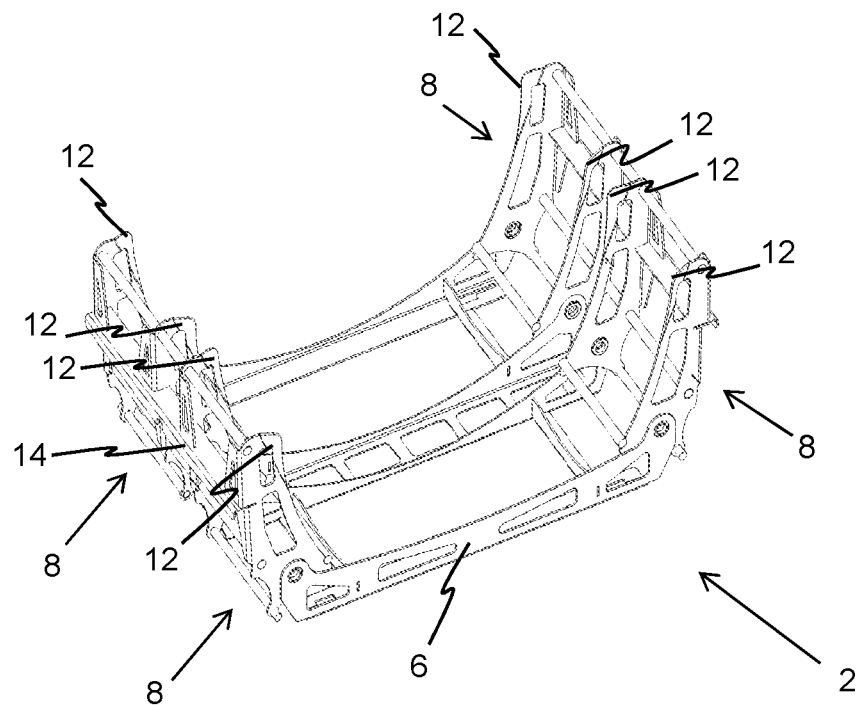
FIG. 1 is a perspective view of a rack according to an embodiment of the present disclosure.
Figure 2:
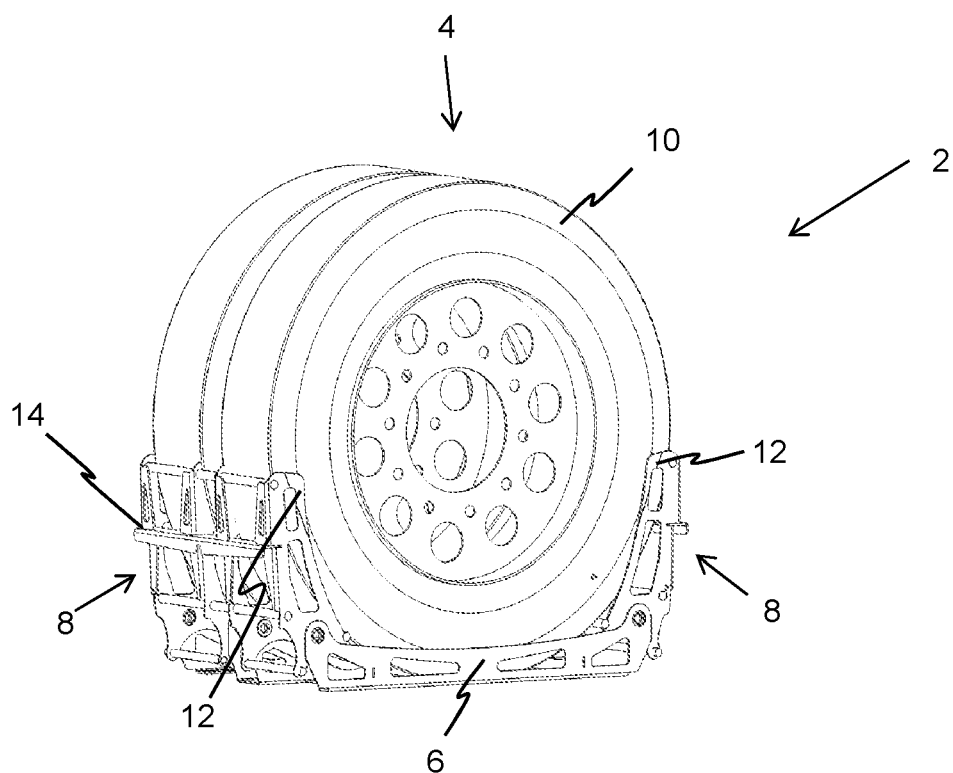
FIG. 2 is a perspective view of the rack of FIG. 1 carrying a pair of wheels.
Figure 3:
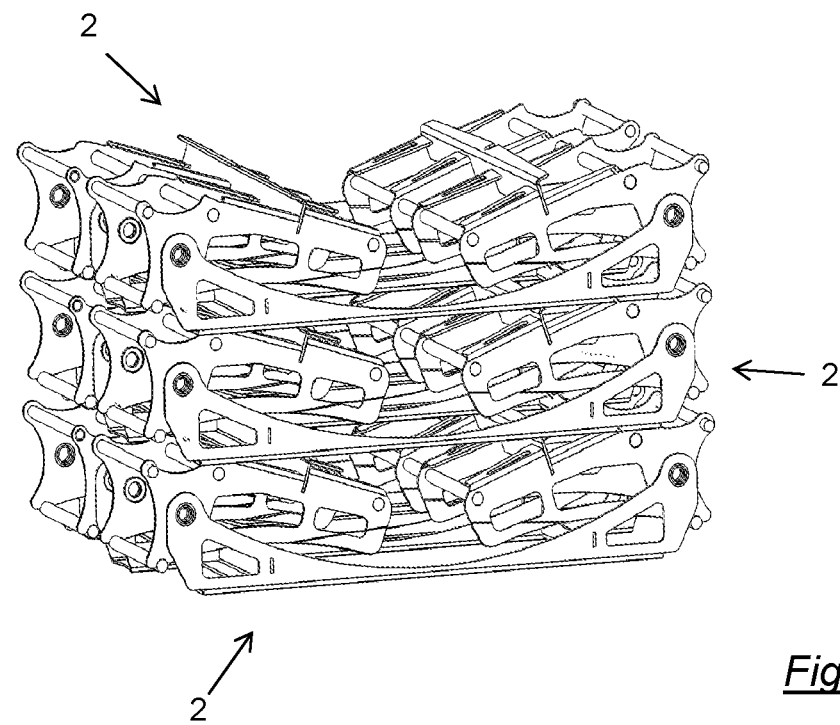
FIG. 3 is a perspective view of a vertical stack of racks, each rack of FIG. 1 in folded configuration.

FIGS. 1 to 4 are views of a rack 2 for carrying a pair of spaced apart wheels 4 in an upright position. The rack 2 has a frame having a base 6 and two pairs of arms 8, the arms 8 of each pair being pivotally attached to opposing sides of the base 6 such that the arms 8 can be pivoted between an open configuration and a folded configuration as illustrated in FIGS. 2 and 3. In the open configuration, each pair of arms 8 is arranged to extend generally upwardly so as to receive an upright wheel 4 therebetween. In the folded configuration the arms 8 are foldable inwardly onto the base 6 so as to provide a compact configuration for storage.

In particular, the rack 2 is configured to carry a dual set of wheels 4, such as those used on opposing sides of each axle of heavy vehicles, the wheels 4 being carried in the arms 8 in an upright spaced-apart configuration which is substantially the same as the spaced-apart configuration when the dual set of wheels 4 is installed on the axle. In particular, the rack 2 is configured to carry the wheels 4 such that the stud hole alignment of the wheels is maintained from removal to storage to re-installation. This is of particular advantage when wishing to re-install the wheels 4 on the axle after the brake assemblies have been serviced and inspected, which will be discussed in detail further in the disclosure.

Figure 4:
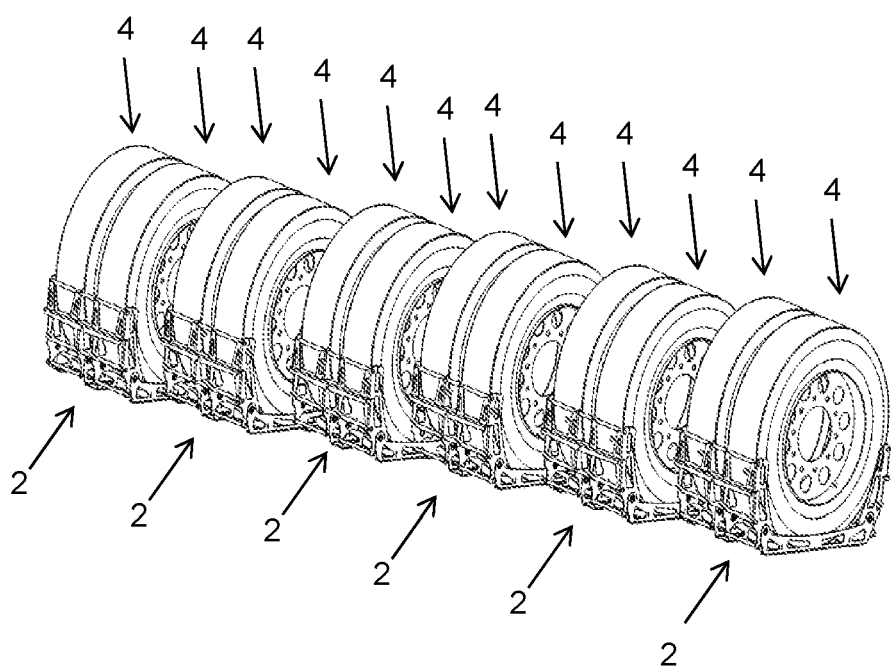
FIG. 4 is a perspective view of a row of racks of FIG. 1, each rack carrying a pair of wheels.

As most clearly illustrated in FIGS. 1 and 4, the tyres 10 of the wheels 4 are supported on lower portions of the arms 8 of the rack 2 in the open configuration which effect pivoting of the arms 8 inwardly such that upper portions of the arms 8 clamp about opposing sides of the rims of the tyres 10 of the upright wheels 4. Advantageously, the weight of the wheels 4 assist in holding the wheels 4 in a stable upright position in which movement is restricted which avoids the risk of rolling or falling thus preventing injury.

Each arm 8 has a width substantially the width of the wheel 4 for which it is adapted to carry and further each arm 8 has a pair of support portions 12 to provide additional support to the wheels 4 when they are received in the rack 2. In particular, the support portions 12, as illustrated in FIGS. 1 and 2, are in the form of wing-like flanges which extend on opposite sides of the upper portions of each arm 8, and which are configured to receive the rim edges of each respective tyre 10. In the embodiment of FIGS. 1 and 2, the support portions 12 are directed inwardly at an angle which is substantially the angle of the edge of the tyre rim, for example at 25° for heavy vehicle tyres. Advantageously, the inwardly facing parts of the arms 8 and support portions 12 conform substantially to the profile of the tyre rim to ensure that the wheels 4 are held in the rack 2 securely and stably.

To ensure that the set of dual wheels 4 are held together constantly in the same configuration and maintain the stud hole alignment, the arms 8 on each side of the frame are coupled together so that they move in tandem and are spaced apart in a substantially similar configuration to the wheels 4 on the axle. As illustrated in FIGS. 1 and 2, the coupling is in the form of a bar 14 extending across both arms 8, this bar 14 also permits access to the rack 2 for engagement to an apparatus 16 for supporting and moving the rack 2 which will be discussed in more detail further in this disclosure.

Advantageously as illustrated in FIG. 2, the rack 2 holds the pair of wheels 4 stably and upright so that they can be stored easily and efficiently without risk of rolling. As illustrated in FIG. 4, all the wheels 4 from a Double B trailer, can be received on respective racks 2 to advantageously store them all in a neat and tidy manner avoiding risk of injury to service technicians. It will be appreciated that while the rack 2 illustrated in the Figures carries a pair of wheels for removal and installation of wheels 4 from a heavy vehicle trailer, the rack can easily be configured to hold a single wheel 4, such as those used in non-commercial vehicles in a similar manner.

FIG. 3 is a perspective view of three such racks 2 of FIG. 1 in a folded configuration. The arms 8 are folded inwardly to form a compact configuration for storage which is reduced in width and in which form they are stackable. The folded rack 2 is stackable onto another such folded rack 2 and so forth so as to form a vertical stack of FIG. 3.

Figure 5:
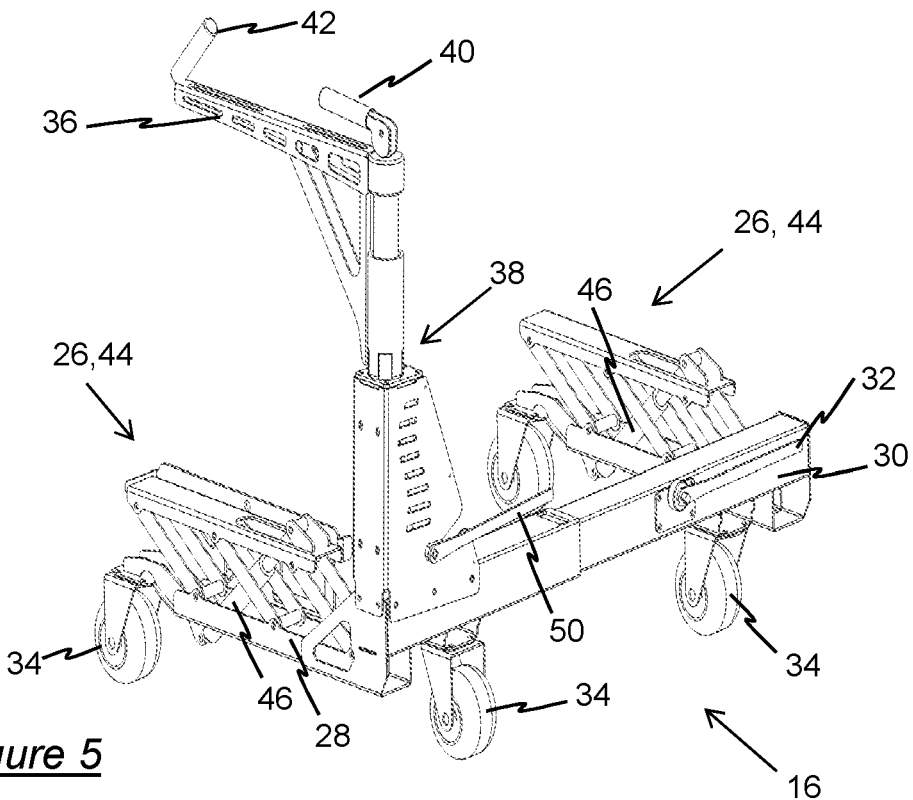
FIG. 5 is a rear perspective view of an apparatus for supporting wheels according to another embodiment of the present disclosure.
Figure 6:
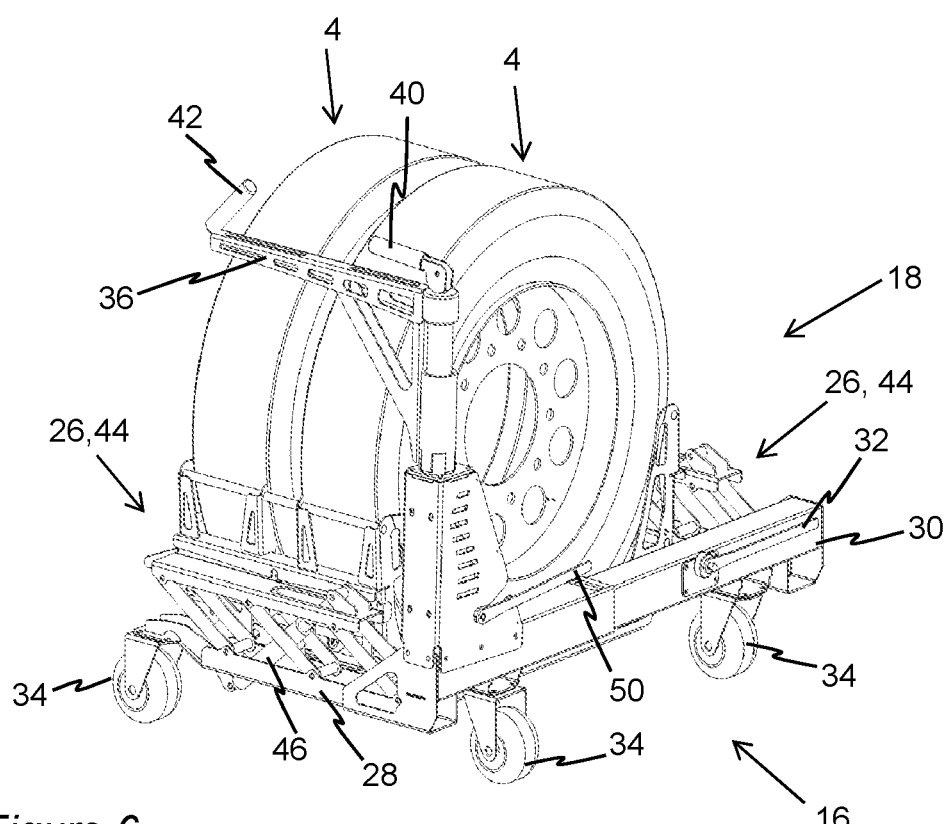
FIG. 6 is a rear perspective view of a system having the apparatus of FIG. 5 for supporting a rack carrying wheels of FIG. 2.
Figure 7:
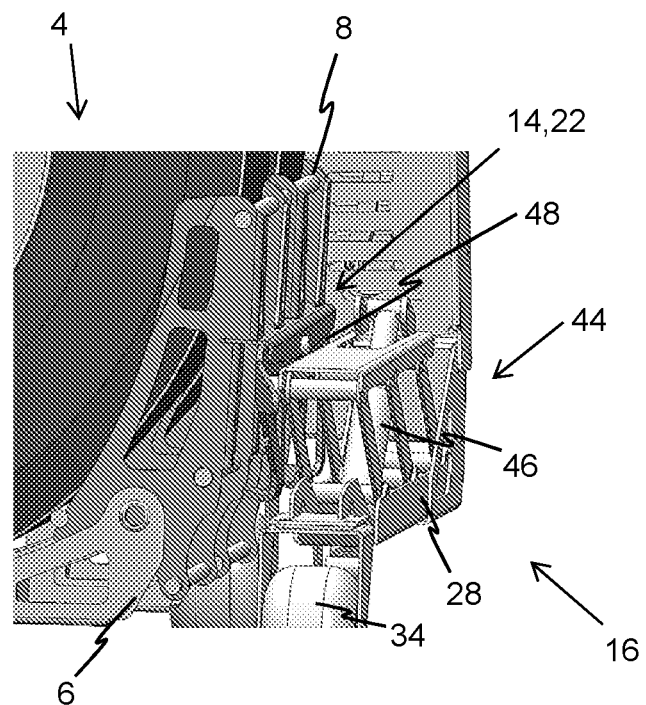
FIG. 7 is an enlarged front perspective view of FIG. 6.
Figure 8:
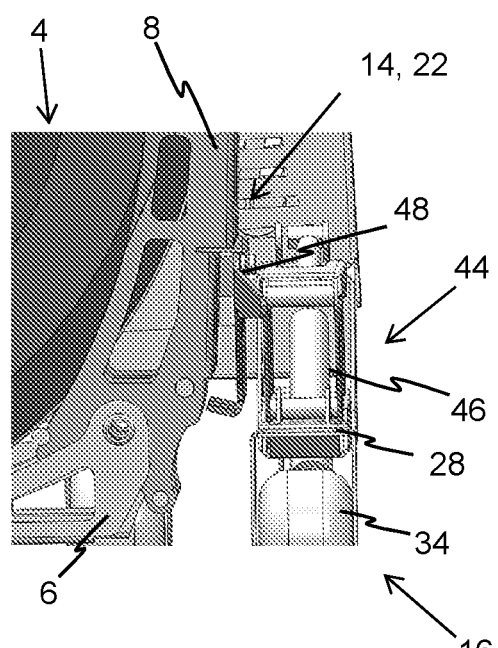
FIG. 8 is a front view of FIG. 7.
Figure 9:
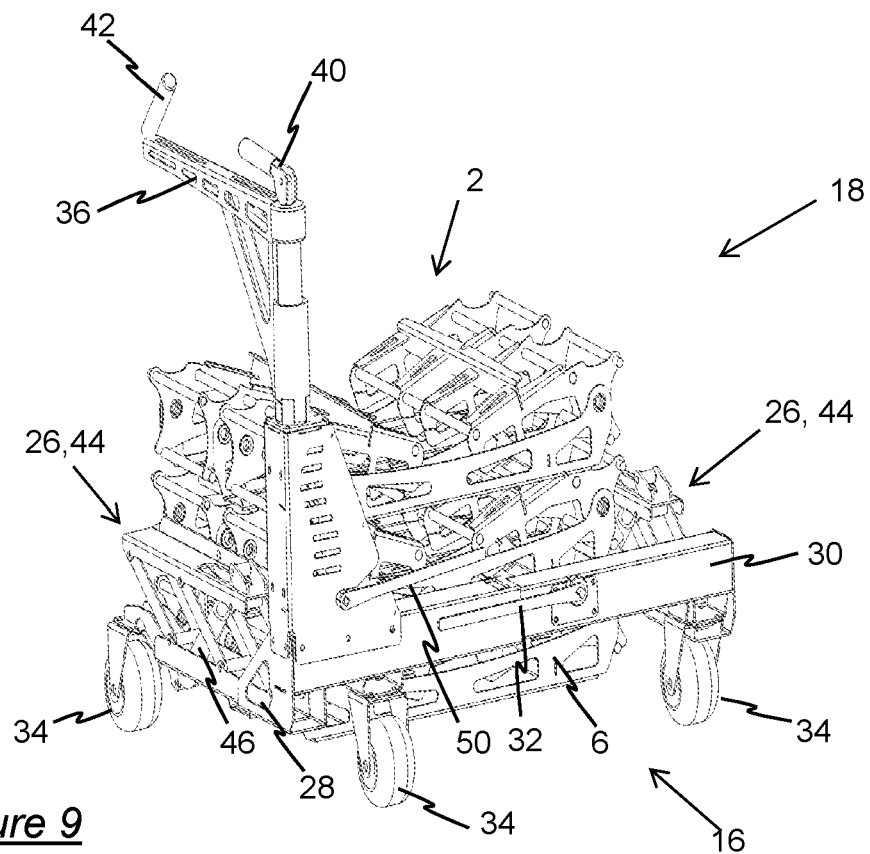
FIGS. 9 and 10 are rear and front perspective views of a system having the apparatus of FIG. 5 carrying the stack of folded racks of FIG. 3.
Figure 10:
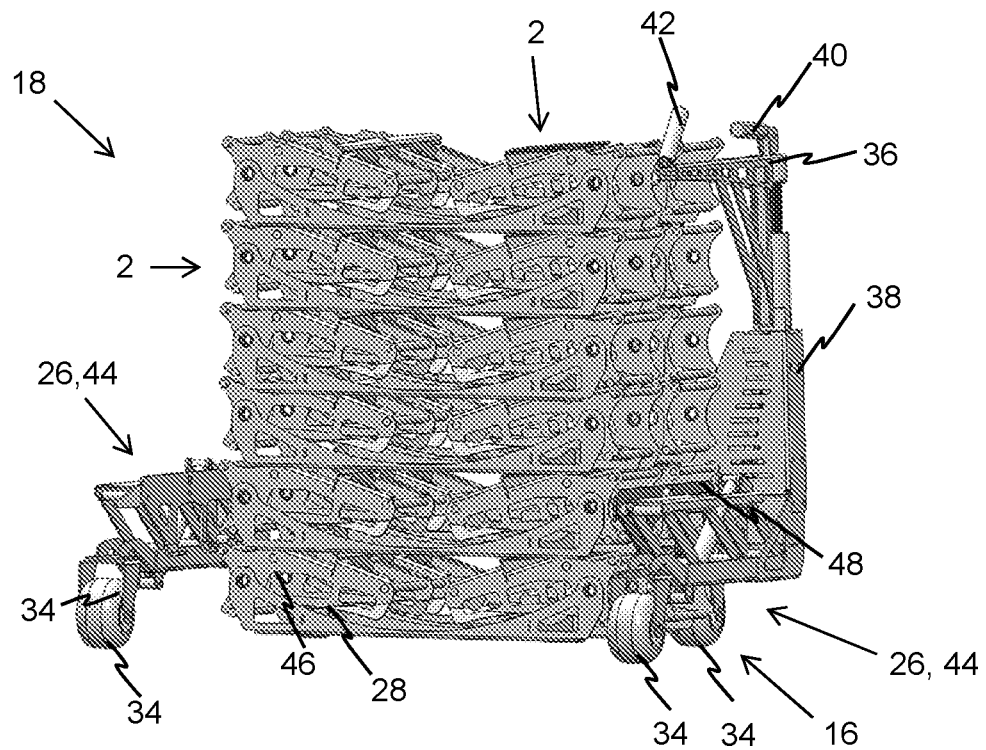

FIGS. 5 to 11 are perspective views of a system 18 having an apparatus 16 for supporting a rack 2 as described hereinbefore. The apparatus 16 is configured to be expandable and contractible between an expanded configuration where the apparatus 16 can support the engaged rack 2 carrying the wheels 4 in the open configuration as illustrated in FIG. 6 and a contracted configuration where the apparatus 16 can support folded racks 2 in a vertical stack as illustrated in FIGS. 9 and 10. The apparatus 16 is also configured to be positionable relative to the axle of the heavy vehicle and movable away from the heavy vehicle to facilitate removal of the stacked racks 2 or rack 2 carrying wheels and is exemplified in the FIGS. 5 to 11 as a trolley.

The apparatus 16 has a rack engagement assembly 20 configured to engage accessible portions 22, 24 on opposing sides of the rack and to support the engaged rack 2 while it is being moved between one position to another. As illustrated in FIG. 6, the expanded apparatus 16 is configured to support the engaged open rack 2 carrying a pair of wheels 4 to move it between an in-situ position and a removed position to facilitate removal and installation of the wheels 4. Correspondingly, as illustrated in FIGS. 9 and 10, the contracted apparatus 16 is configured to support the lowermost engaged folded rack 2 of a vertical stack, and any folded rack(s) 2 supported thereon, for transport and storage thereof.

The apparatus 16 also has a lifting assembly 26 for raising and lowering the rack 2 in the open configuration or in a folded configuration, when so engaged, to facilitate servicing, storage and transport. In the expanded configuration, the lifting assembly 26 is configured to raise and lower the rack engagement assembly 20, and the engaged rack 2 and wheels 4. In the contracted configuration, the lifting assembly 26 is configured to raise and lower the rack engagement assembly 20 to raise and lower an engaged folded rack 2 along with any folded racks 2 supported thereon.

Advantageously the apparatus 16, in the expanded configuration, facilitates easy and efficient support of a rack 2 carrying a pair of wheels without requiring heavy lifting and which can be moved easily to and from a heavy vehicle which reduces the risk of injury, and further reduces the costs and time take to remove and re-install the wheels 4. The apparatus 16, in the contracted configuration, is configured for transport of a stack of folded racks 2 between a storage location and the heavy vehicle.

As illustrated in FIGS. 5 to 11, the apparatus 16 has a generally U-shaped horizontal frame having spaced-apart opposed feet 28 extending from ends of a rear portion 30, the feet 28 forming an opening at one side to permit a rack 2 carrying a pair of wheels or a stack of racks 2 to be received therein, depending on whether the apparatus 16 is in the expanded or contracted configuration.

The rear portion 30 includes a shaft which can be received in a correspondingly shaped sleeve so as to form a telescopic arrangement to widen or narrow the frame and thereby increase or decrease the space between the feet 28. A handle 32 actuates a manual crank arrangement (not shown) effecting the widening or narrowing of the frame. In particular, the handle 32 is rotatable to actuate the manual crank arrangement between a first position where the apparatus 16 is wider as illustrated in FIGS. 5 and 6, and a second position, where the handle is parallel to but oriented in an opposite direction to the first position, where the apparatus 16 is narrower as illustrated in FIGS. 9 and 10. Thus, the apparatus 16 can be expanded and contracted in width from about 1250 mm to about 1100 mm wide.

The frame is supported from the ground by four rollers 34 in the form of swivel castors such that the apparatus 16 is positionable, when in either configuration, relative to the heavy vehicle and movable away from heavy vehicle to remove or install wheels 4, or store or move racks 2. Two rollers 34 are associated with the rear portion 30 of the frame, and one roller 34 is associated with the end portion of each foot 28. A locking arrangement (not shown) may be provided to lock the wheels 4 if necessary for facilitating servicing.

The apparatus 16 has a generally horizontal handle 36 supported at one end from the frame by an upright member 38 in the form of a generally vertical post. The handle 36 is rotatable about the upright member 38 between adjacent sides of the frame to assist a user in moving the apparatus 16 from that frame side. In the example illustrated in FIGS. 5 and 6, the handle 36 is positioned above and parallel to one of the feet 28 and is thus in a position so that a user can easily move the apparatus through a workshop due to its reduced width. However when removing and installing wheels 4, the handle 36 is rotatable into a position parallel to the rear portion 30 of the frame, and is therefore in an optimal position for a user to move the apparatus 16 forwards and backwards such that the rack(s) 2, are easily receivable within the opening to remove and install wheels 4 relative to the axle. The apparatus 16 has a locking arrangement 40 which prevents rotation of the handle 36 for ease of use. The handle 36 also has an angled portion 42 at an end opposite to the vertical post for ergonomic purposes.

The lifting assembly 26 includes two lifting devices 44, one device for lifting each foot 28 of the frame. Each lifting device 44 has foldable elongate members in a parallelogram type linkage having upper and lower portions actuated by a hydraulic cylinder 46 therebetween, and where the lower portions are pivotally attached to a respective foot 28 of the frame. A hydraulically-powered system in the form of a main supply cylinder drives the matching hydraulic cylinders 46 associated with the feet 28 together in a master-slave type arrangement, effecting folding and unfolding of the elongate members on each foot 28 together and thus raising and lowering the rack engagement assembly 20. It will be appreciated that the lifting assembly 26 can be actuated by other systems such as a pneumatic cylinder or electrically operated power screw.

The main cylinder (not shown) is actuated by a ratchet system (not shown) operable by a handle 50. In this embodiment, the ratchet system operates with a 700:1 ratio such that the engaged rack 2 can be raised in small increments necessary for accurate height adjustment, for example when vertically positioning the carried wheels 4 for removal or reinstalment on the vehicle. Further, the lifting assembly is configured 26 to be able to raise the rack engagement assembly 20 to a maximum of about 100 mm, although when the apparatus 16 is generally used for removing or re-installing the wheels 4, the applicant expects that only 10 to 15 mm of lift will be required. Advantageously, the lifting assembly exhibits a substantially vertical lift over the 10 to 15 mm of lift so that the wheels 4 can be lifted off the axle without catching on the stud.

A bleed valve (not shown) is also provided to lower the engaged rack 2 and may be operable by a foot pedal or handle (not shown) on the apparatus 16. In a preferred embodiment, the bleed valve has a retarder (not shown) to ensure the lowering of the rack engagement assembly 20 and engaged rack 2 is slow and controlled.

It will be appreciated that the handles 32, 36, 50 for operation of the apparatus discussed above may be conveniently located and/or arranged to be operated by foot, as well as by hand, and thus may be in the form of a foot pedal.

The rack engagement assembly 20 has a pair of engagement members 48, each engagement member 48 in the form of elongate plates carried by a respective foot 28 of the frame and being configured to engage with accessible portions 22, 24 of the rack 2, depending on the configurations of the apparatus 16 and rack 2. As illustrated in FIGS. 5 to 8, when the apparatus 16 is in the expanded configuration, upper portions of the engagement members 48 are configured to engage with first accessible portions 22 of the rack 2 in the open configuration carrying the wheels 4. In a similar manner, when apparatus 16 is in the contracted configuration, lower portions of the engagement members 48 are configured to engage with second accessible portions 24 of the rack(s) 2 in the folded configuration.

As exemplified in FIGS. 7 and 8, to engage the rack 2 in the open configuration, the upper portion of each engagement member 48 is in the form of an upright elongate flange while the first accessible portion 22 on each side of the rack 2 in the form of a downwardly facing open end of a channel. Thus, the engagement members 48 can be raised by the lifting assembly 26 such that the upright flanges are received in the respective open channel ends. In a preferred embodiment shown in FIGS. 7 and 8, the channels 22 are formed in the bars 14 connecting the arms 8 on each side of the open rack 2. Therefore, once the open rack 2 is thus so engaged and supported by the rack engagement assembly 20, the apparatus 16 can be moved to and from the heavy vehicle to facilitate removal and re-installation of the wheels 4.

Figure 11:
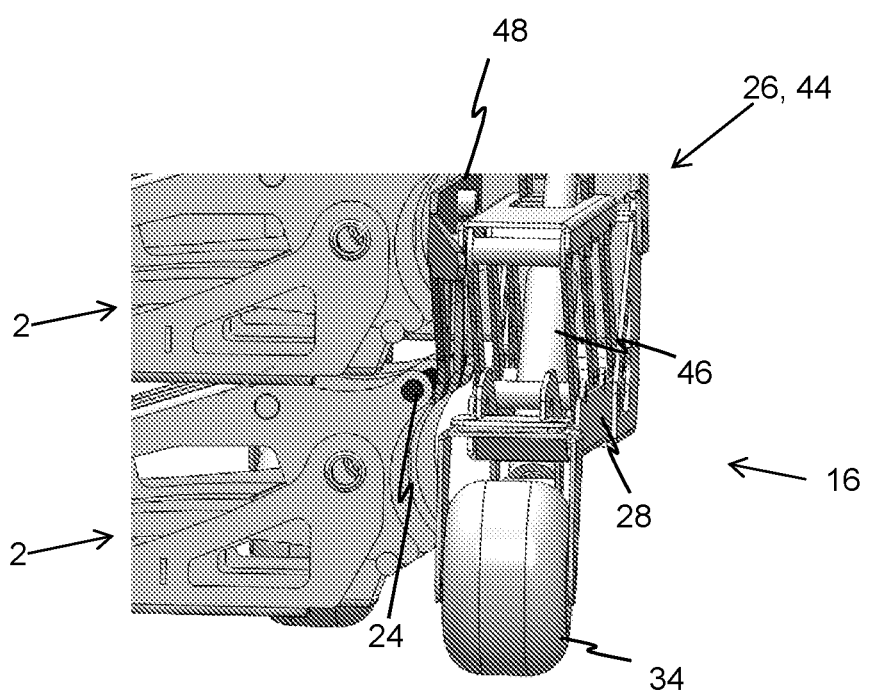
FIG. 11 is an enlarged view of a portion of FIG. 10.

As illustrated in FIG. 11, the rack engagement assembly 20 is engageable with the lower-most folded rack of the vertical stack. The lower portions of the engagement members 48 engage with second accessible portions 24 on the folded lower-most rack 2 which are in the form of generally horizontal rods which extend between opposing sides of each arm. The lower portions of the engagement members 48 are in the form of finger portions which have upwardly directed flange portions at the lower ends thereby forming cavities, open ends of which face upwardly. Thus, in the preferred embodiment shown in FIG. 11, the engagement assembly 20 can be raised by the lifting assembly 26 such that the rods of each arm 8 can be received in the respective cavities. Therefore, once the engaged lower-most folded rack 2, and any folded rack(s) 2 supported thereon, is thus supported by the rack engagement assembly 20, the apparatus 16 can be moved to and from the heavy vehicle to transport the rack(s) 2 to facilitate removal and installation of the wheels 4.

In an exemplary method of use of the system 18 as described above, the apparatus 16 and racks 2 can be used to facilitate removal of all the wheels 4 from the heavy vehicle before inspection and servicing the heavy brake assembly and then re-installation of all the wheels. The applicant estimates that time taken to perform such a process can be reduced by up to 4 hours when compared to existing methods for removing and installing wheels.

In a first step, the apparatus 16 in the contracted configuration engages and supports a vertical stack of folded racks 2 at a storage location. Thus supported, the engaged stack of racks 2 is then moved to the heavy vehicle for distribution in preparation for removal of the wheels 4.

Each rack 2 is unfolded by the technician and positioned under each pair of dual wheels 4. The apparatus 16 is then expanded and then the apparatus 16 is positioned such that the open rack 2 is received between the feet 28 of the frame. The rack engagement assembly 20 is then raised by operating the lifting assembly 26 to engage and raise the open rack 2 such that the wheels 4 are supported thereon. The upper portions of the arms 8 clamp about the tyre rims of the upright wheels 4 to hold the wheels 4 in a stable upright spaced-apart configuration and advantageously maintain the alignment of the stud holes. Furthermore, the two sets of arms 8 of the rack 2 are configured to receive the wheels 4 in a spaced-apart configuration which conforms to the arrangement of the wheels 4 on each axle. This facilitates easy removal of the two wheels of each dual set simultaneously.

Then the engaged rack 2 carrying the wheels 4 can be easily moved by the apparatus 16 to a storage location out of the service area. The lifting assembly 26 can be operated to lower the engaged rack 2 for storage and the apparatus 16 without the rack can be returned to the heavy vehicle to repeat the steps above with the next set of dual wheels until all the wheels 4 have been removed and stored. Advantageously, each set of dual wheels 4 is kept in a stable and upright position which prevents the wheels from rolling or falling over and reduces the area required for storage of the 24 wheels. The stud-hole alignment and spaced-apart configuration of the wheels 4 in each dual set is preserved indefinitely by the rack 2 which facilitates easy re-installation of each dual wheel set 4 onto a respective axle.

The ease of removal and positioning of the apparatus 16 is facilitated by the ability of the handle 36 to rotate between positions, thereby allowing the apparatus 16 to be moved in different directions depending on the manner in which the apparatus 16 is operated. For example, by orienting the handle 36 parallel to the rear portion 30 of the frame, the handle 36 facilitates ease of movement of the apparatus 16 forwards and backwards to move the open rack 2 carrying the wheels 4 relative to the axle or when moving the apparatus 16 to engage the stack of racks 2. However, by rotating the handle 36 to be parallel with a foot 28 of the frame, the reduced width of the apparatus 16 in the direction of travel facilitates ease of handling when transporting the vertical stack of racks 2 or the rack carrying the wheels 4 from a service area to a storage location.

Once the heavy brake assemblies of the heavy vehicle have been inspected and serviced, the wheels 4 can be re-installed using a method which is generally the reverse of the removal procedure discussed above. It will be appreciated that the method described is a mere example, and the apparatus 16 and rack(s) 2 can be used in a variety of ways to facilitate removal and installation of the wheels 4 of the heavy vehicle.

While various embodiments of the present disclosure have been described above, it should be understood that they have been presented by way of example only, and not by way of limitation. It will be apparent to a person skilled in the relevant art that various changes in form and detail can be made therein without departing from the spirit and scope of the disclosure. Thus, the present disclosure should not be limited by any of the above described exemplary embodiments.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A system for removing, storing and installing tyres on a heavy vehicle, the system comprising:
   an apparatus and a rack for holding a wheel in an upright position,
   the rack having a base and a pair of arms, wherein:
      each arm is pivotally attached to opposite sides of the base to pivot between an open configuration, the arms are arranged to extend generally upwardly so as to receive an upright wheel therebetween and a folded configuration, and the arms are foldable inwardly onto the base;
   the apparatus being engageable with the rack with the upright wheel received thereon,
   the apparatus comprising:

a rack engagement assembly configured to engage accessible portions of the rack and to support the rack holding the tyre when so engaged;

a lifting assembly for raising and lowering the rack engagement assembly and the rack, when so engaged by the rack engagement assembly, and wherein, when the rack is so engaged, the apparatus is positionable relative to the heavy vehicle and movable away from the vehicle for facilitating removal and installation of the wheel and wherein, when the apparatus and engaged rack is removed from the vehicle, the lifting apparatus is configured to lower the rack to the ground and disengage from the rack so as to store the upright wheel within the rack.

2. The system according to claim 1, wherein the lifting assembly has a pair of lifting devices, each lifting device comprising at least one linked foldable support member configured to be driven for movement in the vertical plane, an upper portion of the support member(s) associated with the rack engagement assembly and a lower portion of the support member(s) associated with the apparatus and wherein the foldable support member(s) are extendable and retractable to raise and lower the rack engagement assembly.

3. The system according to claim 1, wherein the apparatus is expandable and contractible between an expanded configuration where the rack engagement assembly is configured to engage the rack in the open configuration, and a contracted configuration where the rack engagement assembly is configured to engage the rack in the folded configuration.

4. The system according to claim 1, wherein the apparatus has a frame with spaced-apart feet, the rack being receivable in the space defined by the feet.

5. The system according to claim 1, wherein the rack is configured to receive a pair of upright wheels in parallel spaced-apart configuration which maintains the alignment of respective stud holes of the wheels.

6. The system according to claim 5, wherein the vehicle is a heavy vehicle and the heavy vehicle wheels are receivable in the rack in the parallel spaced-apart configuration.

* * * * *